May 15, 1928.  
J. BAUMANN  
1,670,230  
ATTACHMENT FOR DOUGHNUT CUTTING AND COOKING MACHINES  
Filed July 18, 1927
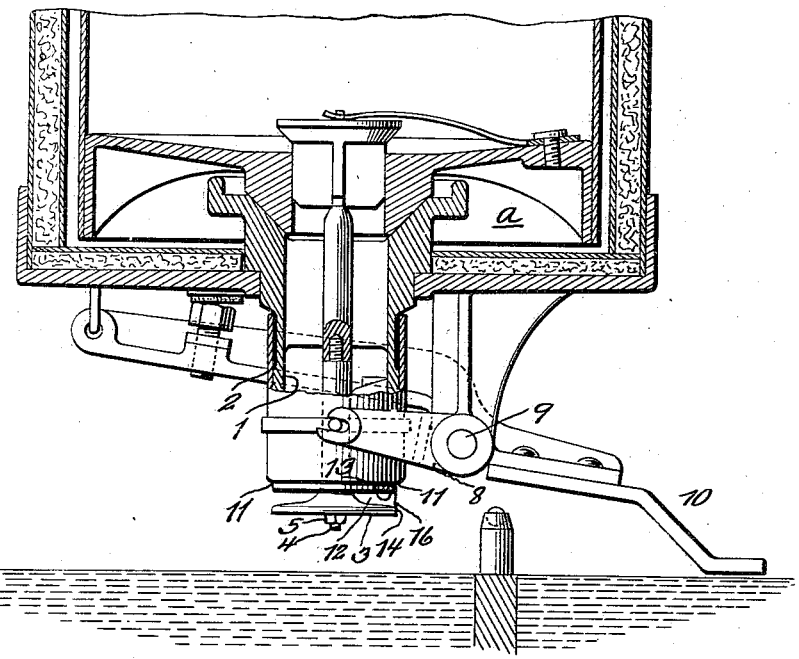
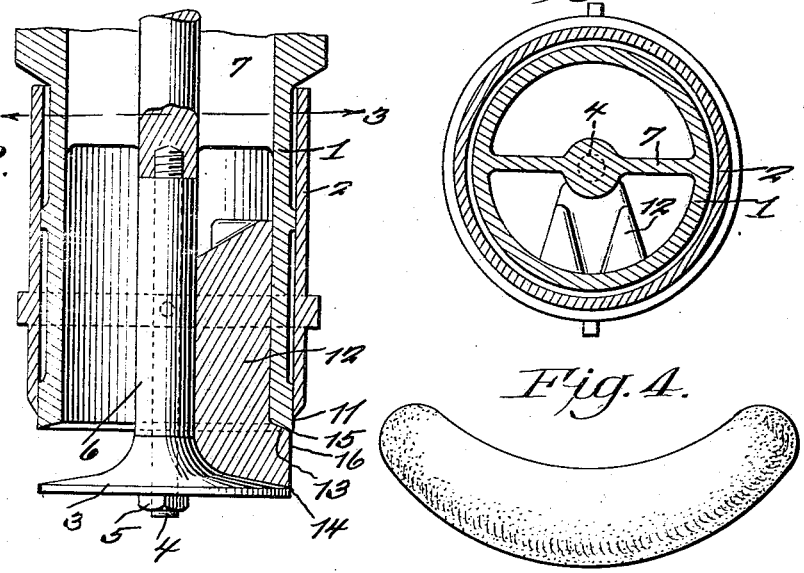
John Baumann INVENTOR
BY Victor J. Evans
ATTORNEY
WITNESS:

Patented May 15, 1928.

1,670,230

UNITED STATES PATENT OFFICE.

JOHN BAUMANN, OF PHILADELPHIA, PENNSYLVANIA.

ATTACHMENT FOR DOUGHNUT CUTTING AND COOKING MACHINES.

Application filed July 18, 1927. Serial No. 206,717. REISSUED

The present invention relates to an attachment for application to a doughnut cutting and cooking machine, the purpose of the invention being to form stick doughnuts of a banana formation, the attachment comprising a divider or separator to be positioned between a stem centrally located within a doughnut forming tube, and the wall of said tube, the lower marginal edge of the tube to engage with a shoulder on the divider or separator to hold the divider in engagement with a disc, between which and the lower marginal edge of the tube a doughnut may be extruded, whereby as the doughnut material such as dough is extruded from the tube and from between the lower marginal edge of the tube and a disc, the material may be divided, allowing the dough to assume an approximate formation of a banana. It is true that the doughnut can be straightened out as much as possible if so desired, or it may be curved in any form.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1—is a vertical sectional view through the lower part of a conventional type of doughnut forming machine, such as is disclosed in the United States Letters Patent No. 1,492,542, and an improved divider or separator as applied within the tube and between the lower marginal edge of the tube and a disc spaced slightly below the lower edge of the tube.

Figure 2—is a vertical sectional view through the tube and also through a movable sleeve operatively and telescopically mounted on the tube for cutting the doughnut as it is extruded, the divider being shown in section between the tube and the stem.

Figure 3—is a cross sectional view on line 3—3 of Figure 2.

Figure 4—is a detailed view of the stick or banana shaped doughnut.

Referring to the drawings, 1 identifies a tube outlet at the lower end of a conventional type of doughnut cooking and cutting machine identified generally by the letter a, and 2 is a cutting sleeve which operates telescopically on the outside of the tube 1. The doughnut material extrudes through the tube and discharges from its lower end between said end and a disc 3, which is detachably mounted by a screw 4 and a nut 5 on the lower end of stem 6, the upper part of the stem being supported integrally from a bridge or web 7 extending across the tube 1. The doughnut cutting sleeve 2 is operated by means of a double armed yoke 8 which is operatively pivoted as identified at 9, and the yoke 8 is operated by a cam member 10, which lies in the path of actuating members not shown, but are employed in connection with the machine as disclosed in the patent herein identified.

As the sleeve 2 moves down after sufficient quantity of dough has extruded from the tube 1, the lower marginal cutting edge 11 of the sleeve 2 will act to cut the doughnut from the main portion of dough in the tube.

Positioned in the tube 1, between the wall of the tube and the stem 6 is a divider or separator 12, which may be made of any suitable material either metal or wood, and it has a shoulder 13, with which the lower inwardly beveled edge of the tube 1 engages. The disc 3 is secured in place on the stem, as previously stated by means of the screw and the nut 4 and 5. By removing the nut the disc may be detached, allowing the divider or separator to be inserted in place. By constructing the divider with a shoulder and allowing the divider to engage down upon the disc, the divider is held securely in position and against displacement. As the dough feeds down through the tube, it is divided at a point from within the tube to a point, where the divider is substantially flush with the edge of the disc at 14 and the outer surface of the tube at 15, so that the sleeve when operated may pass down over the outer exposed edge 16 of the divider and thereby cut the dough to form the doughnut from the main portion of the dough, that portion of the dough being cut having been divided, so that as it falls into the boiling liquid and is cooked it will assume the formation as in Figure 4, substantially banana shape.

In order to remove the divider, the nut 5 can be detached and the disc removed, after which the divider can be withdrawn from the tube.

The invention having been set forth, what is claimed is:

1. The combination with a doughnut cutting and cooking machine having a dough extruding tube with a centrally supported stem therein which is provided with a disc at its lower end spaced below the lower edge of the tube, a cutting sleeve operable on the exterior of the tube, of a divider mounted within the tube between its wall and the stem and having a shouldered portion engaging between the lower edge of the tube and the disc, dividing the dough as it is extruded and cut.

2. As an article of manufacture, a divider for a doughnut cutting and cooking apparatus, comprising a divider body positioned between a central stem and a dough extruding tube and having a shouldered part interposed between a disc on the lower end of said stem and the lower edge of the tube, for dividing the dough as it extrudes from the lower end of the tube.

In testimony whereof he affixes his signature.

JOHN BAUMANN.